(12) United States Patent
Li et al.

(10) Patent No.: US 12,155,957 B2
(45) Date of Patent: *Nov. 26, 2024

(54) VIDEO SPECIAL EFFECTS PROCESSING METHOD AND APPARATUS

(71) Applicant: BEIJING BYTEDANCE NETWORK TECHNOLOGY CO., LTD., Beijing (CN)

(72) Inventors: Xiaoqi Li, Beijing (CN); Jingjin Zhou, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/528,745

(22) Filed: Dec. 4, 2023

(65) Prior Publication Data
US 2024/0106968 A1    Mar. 28, 2024

Related U.S. Application Data

(63) Continuation of application No. 17/849,029, filed on Jun. 24, 2022, now Pat. No. 11,882,244, which is a
(Continued)

(30) Foreign Application Priority Data

Dec. 26, 2019  (CN) .......................... 201911364890.3

(51) Int. Cl.
*H04N 5/262* (2006.01)
*G06V 10/40* (2022.01)
(Continued)

(52) U.S. Cl.
CPC .......... *H04N 5/2621* (2013.01); *G06V 10/40* (2022.01); *G10H 1/366* (2013.01); *H04N 5/2628* (2013.01);
(Continued)

(58) Field of Classification Search
CPC .................................................... H04N 5/2621
See application file for complete search history.

(56) References Cited

U.S. PATENT DOCUMENTS 7,711,241 B2 * 5/2010 Mori .................. H04N 21/8153
386/285
10,127,943 B1 * 11/2018 Patry ........................ H04N 5/76
(Continued)

FOREIGN PATENT DOCUMENTS

CN    101388981 A    3/2009
CN    104754372 A    7/2015
(Continued)

OTHER PUBLICATIONS

EP Office Action issued Sep. 8, 2023 in European Application No. 20905557.3 (4 pages).
(Continued)

*Primary Examiner* — Daniel T Tekle

(57) ABSTRACT

The embodiments of the disclosure disclose a video effect processing method and a video effect processing device. The method includes: detecting audio of a video; acquiring a video frame in the video when the audio is detected at a preset rhythm; performing effect processing on the target object in the video frame to obtain an effect processed video frame; and displaying and playing the effect processed video frame.

15 Claims, 2 Drawing Sheets

Related U.S. Application Data continuation of application No. PCT/CN2020/138415, filed on Dec. 22, 2020.

(51) Int. Cl.
*G10H 1/36* (2006.01)
*H04N 5/265* (2006.01)

(52) U.S. Cl.
CPC ....... *H04N 5/265* (2013.01); *G10H 2210/076* (2013.01)

(56) References Cited

U.S. PATENT DOCUMENTS

| | | | |
|---|---|---|---|
| 2004/0100487 A1* | 5/2004 | Mori | H04N 21/426 |
| 2009/0067723 A1 | 3/2009 | Yamazaki et al. | |
| 2010/0092037 A1 | 4/2010 | Peleg et al. | |
| 2010/0094441 A1 | 4/2010 | Mochizuki et al. | |
| 2019/0080719 A1 | 3/2019 | Patry et al. | |
| 2019/0335229 A1* | 10/2019 | Wang | H04N 21/4394 |
| 2021/0250510 A1* | 8/2021 | Choe | H04N 5/2628 |
| 2021/0350545 A1 | 11/2021 | Fan et al. | |
| 2021/0406305 A1 | 12/2021 | Shen et al. | |

FOREIGN PATENT DOCUMENTS

| | | |
|---|---|---|
| CN | 104811787 A | 7/2015 |
| CN | 107124624 A | 9/2017 |
| CN | 107967706 A | 4/2018 |
| CN | 108111911 A | 6/2018 |
| CN | 108322802 A | 7/2018 |
| CN | 109040615 A | 12/2018 |
| CN | 109729297 A | 5/2019 |
| CN | 110070896 A | 7/2019 |
| CN | 110072047 A | 7/2019 |
| CN | 110392297 A | 10/2019 |
| JP | 42-061644 B2 | 4/2009 |
| JP | 4811433 B2 | 11/2011 |
| JP | 5355422 B2 | 11/2013 |
| JP | 2018-107834 A | 7/2018 |
| KR | 10-2003-0022585 A | 3/2003 |
| WO | 2020/029526 A1 | 2/2020 |

OTHER PUBLICATIONS

Extended EP Search Report dated Dec. 23, 2022 in EP Appl. No. 20905557.3 (8 pages).
First Examination Report dated Oct. 21, 2022 in Indian Patent Application No. 202227042014, with English translation (7 pages).
Notice of Allowance with Search Report dated Jun. 21, 2022 for CN Application No. 201911364890.3 (5 pages).
Office Action issued Jul. 18, 2023 in Japanese Application No. 2022-539328, with English translation (8 pages).
Search Report dated Mar. 22, 2021 for PCT Application No. PCT/CN2020/138415 (8 pages).
Office action received from Indian patent application No. 202227042014 mailed on Aug. 6, 2024, 5 pages.

\* cited by examiner

VIDEO SPECIAL EFFECTS PROCESSING METHOD AND APPARATUS

TECHNICAL FIELD

The present application relates to the field of video effect processing technologies, and in particular, to video effects processing method and apparatus.

BACKGROUND

With the continuous development of internet technology and video effect processing technology, the way of adding effects in videos is gradually pursued by people when videos are shot. The user can add a favorite effect in the shot video by selecting a corresponding effect function, so that the interestingness of video shooting is increased.

In the prior art, only video processing is performed, and video effects are relatively simple.

SUMMARY

This summary is provided to introduce concepts in a simplified form that are further described below in the detailed description. This summary is not intended to identify key features or essential features of the claimed subject matter, nor is it intended to be used to limit the scope of the claimed subject matter.

According to an aspect of the present disclosure, the following technical solution is provided:
a video effect processing method, comprising:
detecting audio of a video, wherein the video comprises a target object;
acquiring a video frame in the video when the audio is detected at a preset rhythm;
performing effect processing on the target object in the video frame to obtain an effect processed video frame; and
displaying and playing the effect processed video frame.

In order to achieve the above object, according to an aspect of the present disclosure, the following technical solution is provided:
an audio detection module for detecting audio of a video, wherein the video comprises a target object;
an image acquisition module for acquiring a video frame in the video when the audio is detected at a preset rhythm;
an effect processing module for performing effect processing on the target object in the video frame to obtain an effect processed video frame; and
an effect display module for displaying and playing the effect processed video frame.

In order to achieve the above object, according to an aspect of the present disclosure, the following technical solution is provided:
an electronic device, comprising:
a memory for storing non-transitory computer readable instructions; and
a processor for executing the computer readable instructions which, when executed, cause the processor to implement any of the video effect processing method described above.

In order to achieve the above object, according to an aspect of the present disclosure, the following technical solution is provided:
a non-transitory computer-readable storage medium storing non-transitory computer readable instructions which, when executed by a computer, cause the computer to perform any of the video effects processing methods described above.

In order to achieve the above object, according to still another aspect of the present disclosure, the following technical solution is also provided:
a video effect processing terminal comprising any of the above video effect processing devices.

According to the embodiments of the disclosure, audio of the video is detected during the process of playing the video. A video frame in the video is obtained when the audio is detected at a preset rhythm, and effect processing is performed on the target object in the video frame to obtain an effect processed video frame. The effect processed video frame is displayed and played, which can combine the audio and the effect and thus enrich the video effect function.

The foregoing description is only an overview of the technical solutions of the present disclosure, and in order to make the technical means of the present disclosure more clearly understood, the present disclosure may be implemented in accordance with the content of the description, and in order to make the above and other objects, features, and advantages of the present disclosure more clearly understood, the following preferred embodiments are specifically illustrated below, and the detailed description is given in conjunction with the accompanying drawings.

DETAILED DESCRIPTION

Figure 1:
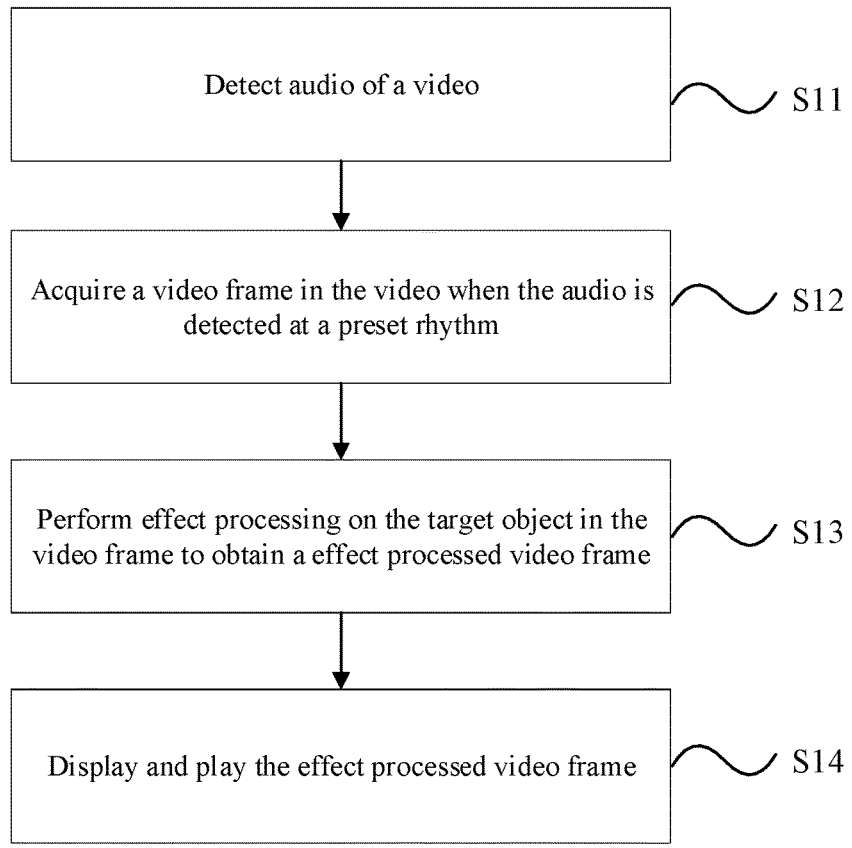
FIG. 1 is a schematic flow chart diagram of a video effect processing method according to an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein, but rather are provided for a more complete and thorough understanding of the present disclosure. It should be understood that the drawings and the embodiments of the disclosure are for illustration purposes only and are not intended to limit the scope of the disclosure.

It should be understood that the various steps recited in method embodiments of the present disclosure may be performed in a different order, and/or performed in parallel. Moreover, the method embodiments may include additional steps and/or omit performing of the illustrated steps. The scope of the present disclosure is not limited in this respect.

The term "including" and variations thereof as used herein is intended to be open-ended, i.e., "including but not limited to". The term "based on" means "based at least in part on". The term "one embodiment" means "at least one embodiment"; the term "another embodiment" means "at least one additional embodiment"; the term "some embodiments" means "at least some embodiments". Relevant definitions for other terms will be given in the following description.

The technical problem to be solved by the present disclosure is to provide a video effect processing method, so as to at least partially solve the technical problem in the prior art that video effects are relatively single.

Embodiment 1

In order to solve the technical problem that video effects are relatively simple in the prior art, the embodiments of the present disclosure provide a video effect processing method. As shown in FIG. 1, the video effect processing method mainly comprises the following steps S11 to S14.

Step S11: detecting audio of a video, wherein the video comprises a target object.

The video may be a video obtained in real time, and specifically, the video may be obtained in real time through a camera or a video camera of a terminal. It may also be a video, a moving image or an image sequence consisting of a series of still pictures pre-stored locally at the terminal. The terminal can be a mobile terminal (for example, a smartphone, a tablet computer, a notebook computer or a wearable device) or a fixed terminal (for example, a desktop computer).

The target object may be preset and may be, for example, a human face, an animal, a plant, a human body, a gesture, and the like. Specifically, the target object may be obtained by detecting a video by using an existing target detection algorithm. The adopted target detection algorithm can be a deep learning-based target detection algorithm and a neural network-based image recognition algorithm.

The audio may be music or background audio comprised in the video itself, or may be audio selected by the user when the video is captured. Specifically, in the video playing process, audio is played simultaneously, and the audio may be music containing lyrics or light music.

Step S12: acquiring a video frame in the video when the audio is detected at a preset rhythm.

Specifically, a corresponding audio signal is obtained according to the audio, and then an audio signal detection algorithm is adopted to detect the obtained audio signal, so as to obtain rhythm information of the audio. Audio signal detection algorithms that may be employed include the BPM (Beat Per Minute) algorithm or the modified BPM algorithm.

The rhythm information comprises at least one of a beat point, a stress point, a drum point or a preset melody point. Beats comprise 1/4, 2/4, 3/4, 4/4, 3/8, 6/8, 7/8, 9/8, 12/8 time and the like. Stresses include general stresses, double stresses, or drumbeats. Generally, the stress refers to adding a force or breath on a certain sound. The double stress is adding a force or breath to a sound until the end of the time value, i.e. after the end of key-touching with a force in piano, its vibration string wave is still in action. The drum point is a beat or a tapping sound on a drum, or a beat drum point of a percussion part in an orchestra.

Step S13: performing effect processing on the target object in the video frame to obtain an effect processed video frame.

Specifically, the following two cases can be processed according to the video: firstly, each frame of image in a video comprises a target object, in which case the target object can be directly subjected to effect processing according to a preset rhythm; secondly, since the target object is not included in each image frame the video, only when the target object is determined to appear at the playing position of the video at the current moment and the audio is determined at the preset rhythm at the same time, the target object is subjected to effect processing according to the preset rhythm.

Step S14: displaying and playing the effect processed video frame.

In the embodiment, audio of the video is detected during the process of playing the video. A video frame in the video is obtained when the audio is detected at a preset rhythm, and effect processing is performed on the target object in the video frame to obtain an effect processed video frame. The effect processed video frame is displayed and played, which can combine the audio and the effect and thus enrich the video effect function.

In an optional embodiment, the step S13 specifically comprises:

step S131: determining an effect processing mode corresponding to the preset rhythm according to the preset rhythm;

Step S132: performing effect processing on the target object in the video frame according to the effect processing mode to obtain an effect processed video frame.

The effect processing mode is zoom-out processing or zoom-in processing. The zoom-out processing is to magnify the target object in the video frame to realize a zooming-out video effect, and the zoom-in processing is to reduce the target object in the video frame to realize a zooming-in video effect.

Specifically, when the target object is magnified, it may be the case that only the target object in the video frame is magnified. For example, the target object is first extracted from the video frame, and the rest of the image area other than the target object in the video frame is used as a background region. Only the target object is magnified, while the background region remains unchanged, and then the magnified target object is superimposed on the background region to obtain an effect processed video frame. Similarly, when the target object is reduced, it may be the case that only the target object in the video frame is reduced. For example, the target object is first extracted from the video frame, and the rest of the image area other than the target object in the video frame is used as a background region. Only the target object is reduced, while the background region remains unchanged, and then the reduced target object is superimposed on the background region to obtain a video frame after effect processing.

In an optional embodiment, the effect processing mode is zoom-out processing if the preset rhythm is a strong beat, and the effect processing mode is zoom-in processing if the preset rhythm is a weak beat; or, the effect processing mode is zoom-in processing if the preset rhythm is a strong beat, and the effect processing mode is zoom-out processing if the preset rhythm is a weak beat.

Specifically, the target object in the video frame is magnified to realize a zoom-out video effect if the preset rhythm is a strong beat, and the target object is reduced in the video frame to realize a zoom-in video effect if the preset rhythm is a weak beat. Or the target object in the video frame is reduced to realize a zoom-in video effect if the preset rhythm is a strong beat, and the target object is magnified in the video frame to realize a zoom-out video effect if the preset rhythm is a weak beat.

In an optional embodiment, the effect processing mode is zoom-out processing by adopting a first magnification parameter if the preset rhythm is a strong beat, and the effect processing mode is zoom-out processing by adopting a second magnification parameter if the preset rhythm is a weak beat, wherein the first magnification parameter and the second magnification parameter are different parameters; or, the effect processing mode is zoom-in processing by adopting a first reduction parameter if the preset rhythm is a strong beat, and the effect processing mode is zoom-in processing by adopting a second reduction parameter if the preset rhythm is a weak beat, wherein the first reduction parameter and the second reduction parameter are different parameters.

The corresponding zooming parameters may be set in advance according to the beat points in the preset rhythm, and specifically may be reduction parameters or magnification parameters. The target object is reduced when the corresponding beat point is played in the playing process of the preset rhythm if the parameter is a reduction parameter, and the target object is magnified when the corresponding beat is played in the playing process of the preset rhythm if the parameter is a magnification parameter.

In an alternative embodiment, the first magnification parameter is greater than the second magnification parameter, and the first reduction parameter is greater than the second reduction parameter.

Specifically, the preset rhythm may comprise a plurality of stresses, or a plurality of drumbeats, or at least one stress and at least one drumbeat. And different zooming parameters can be set according to the volume of the stress or the drumbeats, namely, the stress or the drumbeats with higher volume correspond to a larger magnification parameter, and the stress or the drumbeat with lower volume correspond to a smaller magnification parameter. In this way, the target object can be magnified and reduced, or reduced and magnified, or gradually magnified, or gradually reduced when different stress or drumbeat are played in the playing process of the preset rhythm.

For example, each bar has only two beats when the beat is 2/4 time, and the law of beat is strong and weak. The sequence of the strong and weak beats can be determined according to the number of bars included in the preset rhythm. For example, when the preset rhythm includes one bar, the sequence of the strong and weak beats may be determined as [strong weak], and when the preset rhythm includes two bars, the sequence of the strong and weak beats may be determined as [strong weak strong weak], and so on, which will not be described herein again.

When the beat is 3/4 time, each bar has only three beats, and the law of beat is strong, weak, weak. The sequence of the strong and weak beats can be determined according to the number of bars included in the preset rhythm. For example, when the preset rhythm includes one bar, the sequence of the strong and weak beats may be determined as [strong weak weak], and when the preset rhythm includes two bars, the sequence of the strong and weak beats may be determined as [strong weak weak strong weak weak], and so on, which will not be described herein again.

When the beat is 4/4, each bar has only four beats, and the law of beat is strong, weak, sub-strong, weak. The sequence of the strong and weak beats can be determined according to the number of bars included in the preset rhythm. For example, when the preset rhythm includes one bar, the sequence of the strong and weak beats may be determined as [strong weak sub-strong weak]. When the preset rhythm includes two bars, the sequence of the strong and weak beats may be determined as [strong weak sub-strong weak strong weak sub-strong weak], and so on, which will not be described herein again.

When the beat is 6/8, each bar has only six beats, and the law of beat is strong, weak, weak, sub-strong, weak, weak. The sequence of the strong and weak beats can be determined according to the number of bars included in the preset rhythm. For example, when the preset rhythm includes one bar, the sequence of the strong and weak beats may be determined as [strong weak weak sub-strong weak weak], and when the preset rhythm includes two bars, the sequence of the strong and weak beats may be determined as [strong weak weak sub-strong weak weak strong weak weak sub-strong weak weak], and so on, which will not be described herein again.

The reduction parameter or the magnification parameter can be respectively set according to the corresponding strong beat and weak beat. The set rule may be that the zoom factor of the strong beat is greater than the zoom factor of the weak beat, or the zoom factor of the strong beat is smaller than the zoom factor of the weak beat.

For example, when the sequence of the strong and weak beats is [strong weak], the effect parameter corresponding to the strong beat may be set as a magnification parameter, and the effect parameter corresponding to the weak beat may be set as a reduction parameter, so that during the playing process of the preset rhythm, the target object is magnified when the strong beat is played, and the target object is reduced when the weak beat is played, thereby achieving an effect of magnifying and reducing the target object. Or setting the effect parameter corresponding to the strong beat as a reduction parameter and setting the effect parameter corresponding to the weak beat as an magnification parameter, so that during the playing process of the preset rhythm, the target object is reduced when the strong beat is played, and the target object is magnified when the weak beat is played, thereby realizing an effect of reducing and amplifying the target object. Or setting the effect parameter corresponding to the strong beat as a smaller reduction parameter, and setting the effect parameter corresponding to the weak beat as a larger reduction parameter, so that during the playing process of the preset rhythm, the target object is reduced when the strong beat is played, and the target object is further reduced when the weak beat is played, thereby realizing an effect of gradually reducing the target object. Or setting the effect parameter corresponding to the strong beat as a smaller magnification parameter, and setting the effect parameter corresponding to the weak beat as a larger magnification parameter, so that in the playing process of the preset rhythm, the target object is magnified when the strong beat is played, and the target object is further magnified when the weak beat is played, thereby to realize an effect of gradually magnifying the target object.

In an alternative embodiment, the zoom-out processing specifically is: in the video frame, magnifying the target object to realize the zoom-out video effect until the target object is magnified to a maximum threshold value, and performing a shaking function on a video picture corresponding to the target object after being magnified to the maximum threshold value; and the zoom-in processing specifically is: in the video frame, reducing the target object to realize the zoom-in video effect until the target object is reduced to a minimum threshold value, and performing a shaking function on a video picture corresponding to the target object after being reduced to the minimum threshold value.

Specifically, when the target object displayed on the terminal screen is magnified to the maximum or reduced to the minimum, a shaking parameter is obtained, wherein the shaking parameter comprise a shaking direction (e.g., forward and backward shaking), a shaking amplitude, a shaking frequency, and the like. The shaking amplitude may be related to a zoom parameter. For example, it can be set that the larger the magnification parameter, the larger the shaking amplitude, and the larger the reduction parameter, the smaller the shaking amplitude. The shaking direction and the shaking frequency can be set by self-definition. The shaking parameter may be preset and stored locally in the terminal or on the network, and acquired locally from the terminal or on the network when acquired. And the video picture corresponding to the target object which is magnified to the maximum or reduced to the minimum is shaken according to the obtained shaking parameter.

It will be appreciated by those of skill in the art that obvious variations (e.g., combinations of the enumerated modes) or equivalents may be made based on the various embodiments described above.

In the above, although the steps in the embodiments of the video effect processing method are described in the above sequence, it should be clear to those skilled in the art that the steps in the embodiments of the present disclosure are not necessarily performed in the above order, and may also be performed in other orders such as reverse sequence, parallel sequence, and cross sequence, and further, on the basis of the above steps, those skilled in the art may also add other steps, and these obvious variations or equivalents should also be included in the protection scope of the present disclosure, and are not described herein again.

The following are the embodiments of the device of the present disclosure, which may be used to perform the steps implemented by the embodiment of the method in the present disclosure. For convenience of description, only the parts relevant to the embodiments of the present disclosure are shown, and for specific technical details that are not disclosed, please refer to the embodiments of the method of the present disclosure.

Embodiment 2

Figure 2:
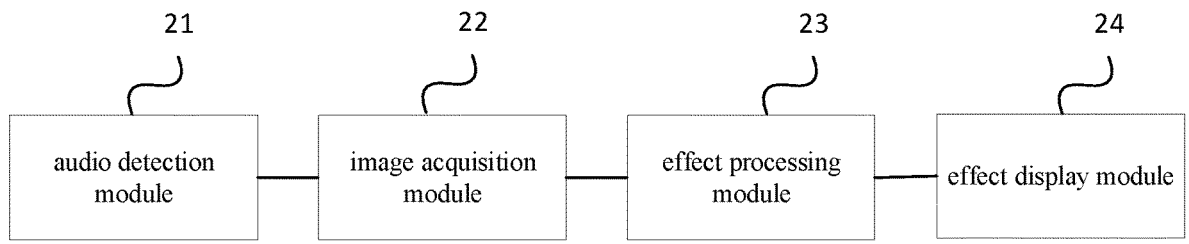
FIG. 2 is a schematic structural diagram of a video effect processing device according to an embodiment of the present disclosure.

In order to solve the technical problem that video effects are relatively simple in the prior art, the embodiments of the present disclosure provides a video effect processing device. The device may perform the steps in the embodiments of the video effect processing method described in Embodiment 1. As shown in FIG. 2, the device mainly comprises: an audio detection module 21, an image acquisition module 22, an effect processing module 23 and an effect display module 24; wherein, the audio detection module 21 is configured to detect audio of a video, wherein the video comprises a target object;
the image acquisition module 22 is configured to acquire a video frame in the video when the audio is detected at a preset rhythm;
the effect processing module 23 is configured to perform effect processing on the target object in the video frame to obtain an effect processed video frame;
the effect display module 24 is configured to display and play the effect processed video frame.

Further, the effect processing module 23 is specifically configured to: determine an effect processing mode corresponding to the preset rhythm according to the preset rhythm; perform effect processing on the target object in the video frame according to the effect processing mode to obtain an effect processed video frame;
wherein the effect processing mode is zoom-out processing or zoom-in processing, the zoom-out processing is to magnify the target object in the video frame to realize a zooming-out video effect, and the zoom-in processing is to reduce the target object in the video frame to realize a zooming-in video effect.

Further, the effect processing mode is zoom-out processing if the preset rhythm is a strong beat, and the effect processing mode is zoom-in processing if the preset rhythm is a weak beat; or, the effect processing mode is zoom-in processing if the preset rhythm is a strong beat, and the effect processing mode is zoom-out processing if the preset rhythm is a weak beat.

Further, the effect processing mode is zoom-out processing by adopting a first magnification parameter if the preset rhythm is a strong beat, and the effect processing mode is zoom-out processing by adopting a second magnification parameter if the preset rhythm is a weak beat, wherein the first magnification parameter and the second magnification parameter are different parameters; or, the effect processing mode is zoom-in processing by adopting a first reduction parameter if the preset rhythm is a strong beat, and the effect processing mode is zoom-in processing by adopting a second reduction parameter if the preset rhythm is a weak beat, wherein the first reduction parameter and the second reduction parameter are different parameters.

Further, the first magnification parameter is greater than the second magnification parameter, and the first reduction parameter is greater than the second reduction parameter.

Further, the zoom-out processing specifically is: in the video frame, magnifying the target object to realize the zoom-out video effect until the target object is magnified to a maximum threshold value, and performing a shaking function on a video picture corresponding to the target object after being magnified to the maximum threshold value; and, the zoom-in processing specifically is: in the video frame, reducing the target object to realize the zoom-in video effect until the target object is reduced to a minimum threshold value, and performing a shaking function on a video picture corresponding to the target object after being reduced to the minimum threshold value.

Further, the preset rhythm is a beat point, a stress point, a drum point or a preset melody point in the audio.

For detailed descriptions of working principles, technical effects achieved, and the like of embodiments of the video effect processing device, reference may be made to the relevant descriptions in the foregoing embodiments of the video effect processing method, and details will not be repeated here.

Embodiment 3

Figure 3:
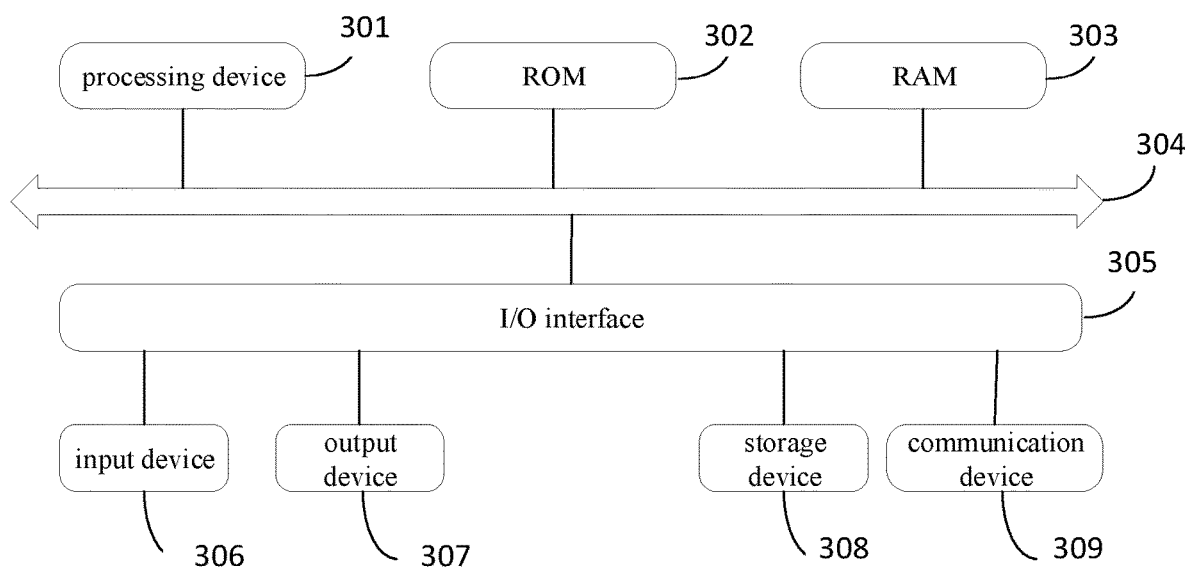
FIG. 3 is a schematic structural diagram of an electronic device according to an embodiment of the present disclosure.

FIG. 3 is a structural diagram of an electronic device 300 suitable for use in implementing embodiments of the present disclosure. The terminal device in the embodiments of the present disclosure may include, but is not limited to, a mobile terminal such as a mobile phone, a notebook computer, a digital broadcast receiver, a PDA (personal digital assistant), a PAD (tablet computer), a PMP (portable multimedia player), a vehicle terminal (e.g., a car navigation terminal), and the like, and a fixed terminal such as a digital TV, a desktop computer, and the like. The electronic device shown in FIG. 3 is only an example, and should not bring any limitation to the functions and the scope of use of the embodiments of the present disclosure.

As shown in FIG. 3, the electronic device 300 may include processing device (e.g., a central processing unit, a graphics processor, etc.) 301 that may perform various appropriate actions and processes in accordance with a program stored in a Read Only Memory (ROM) 302 or a program loaded from storage device 308 into a Random Access Memory (RAM) 303. In the RAM 303, various programs and data necessary for the operation of the electronic device 300 are also stored. The processing device 301, the ROM 302, and the RAM 303 are connected to each other via a bus 304. An input/output (I/O) interface 305 is also connected to the bus 304.

Generally, the following devices may be connected to the I/O interface 305: input device 306 including, for example, a touch screen, a touch pad, a keyboard, a mouse, a camera, a microphone, an accelerometer, a gyroscope, or the like; output device 307 including, for example, a Liquid Crystal Display (LCD), a speaker, a vibrator, and the like; memory device 308 including, for example, magnetic tape, hard disk, etc.; and communication device 309. The communication device 309 may allow the electronic device 300 to communicate with other devices, wireless or wired, to exchange data. While FIG. 3 illustrates an electronic device 300 having various devices, it is to be understood that not all illustrated devices are required to be implemented or provided. More or fewer devices may be alternatively implemented or provided.

In particular, according to the embodiment of the present disclosure, the processes described above with reference to the flow diagrams may be implemented as computer software programs. For example, the embodiment of the present disclosure includes a computer program product including a computer program carried on a non-transitory computer readable medium, the computer program containing program code for performing the method illustrated by the flow chart. In such an embodiment, the computer program may be downloaded and installed from a network via the communication device 309, or installed from the memory device 308, or installed from the ROM 302. The computer program, when executed by the processing device 301, performs the above-described functions defined in the method of the embodiments of the present disclosure.

It should be noted that the computer readable medium of the present disclosure may be a computer readable signal medium or a computer readable storage medium or any combination of the two. A computer readable storage medium may be, for example, but not limited to, an electronic, magnetic, optical, electromagnetic, infrared, or semiconductor system, apparatus, or device, or any combination of the foregoing. More specific examples of the computer readable storage medium may include, but are not limited to: an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain, or store a program for use by or in connection with an instruction execution system, apparatus, or device. And in the present disclosure, a computer readable signal medium may include a propagated data signal with computer readable program code embodied therein, for example, in baseband or as part of a carrier wave. Such a propagated data signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to: electrical wires, optical cables, RF (radio frequency), etc., or any suitable combination of the foregoing.

In some embodiments, the clients, servers may communicate using any currently known or future developed network Protocol, such as HTTP (HyperText Transfer Protocol), and may be interconnected with any form or medium of digital data communication (e.g., a communication network). Examples of communication networks include a local area network ("LAN"), a wide area network ("WAN"), the Internet, and peer-to-peer networks (e.g., ad hoc peer-to-peer networks), as well as any currently known or future developed network.

The computer readable medium may be embodied in the electronic device; or may be separate and not incorporated into the electronic device.

The computer readable medium carries one or more programs which, when executed by the electronic device, cause the electronic device to: detecting audio of a video, wherein the video comprises a target object; acquiring a video frame in the video when the audio is detected at a preset rhythm; performing effect processing on the target object in the video frame to obtain a video frame after performing the effect processing; and displaying and playing the effect processed video frame.

Computer program code for performing operations for aspects of the present disclosure may be written in any combination of one or more programming languages, including but not limited to an object oriented programming language such as Java, Smalltalk, C++, and including conventional procedural programming languages, such as the "C" programming language or similar programming languages. The program code may execute entirely on the user's computer, partly on the user's computer, as an independent software package, partly on the user's computer and partly on a remote computer, or entirely on the remote computer or server. In the scenario concerning the remote computer, the remote computer may be connected to the user's computer through any type of network, including a Local Area Network (LAN) or a Wide Area Network (WAN), or the connection may be made to an external computer (for example, through the Internet using an Internet service provider).

The flowchart and block diagrams in the accompanying drawings illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur in an order different from the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units described in the embodiments of the present disclosure may be implemented by software or hardware. The name of a unit does not constitute a limitation of the unit itself in some cases, for example, the first acquisition unit may also be described as "a unit acquiring at least two internet protocol addresses".

The functions described herein above may be performed, at least in part, by one or more hardware logic components. For example, without limitation, exemplary types of hardware logic components that may be used include: field Programmable Gate Arrays (FPGAs), Application Specific Integrated Circuits (ASICs), Application Specific Standard Products (ASSPs), system on a chip (SOCs), Complex Programmable Logic Devices (CPLDs), and the like.

In the context of this disclosure, a machine-readable medium may be a tangible medium that can contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, means, or device, or any suitable combination of the foregoing. More specific examples of a machine-readable storage medium would include an electrical connection based on one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, there is provided a video effect processing method, comprising:
  detecting audio of a video, wherein the video comprises a target object;
  acquiring a video frame in the video when the audio is detected at a preset rhythm;
  performing effect processing on the target object in the video frame to obtain an effect processed video frame; and
  displaying and playing the effect processed video frame.

Further, the performing effect processing on the target object in the video frame to obtain a video frame after performing the effect processing comprises:
  determining an effect processing mode corresponding to the preset rhythm according to the preset rhythm; and
  performing effect processing on the target object in the video frame according to the effect processing mode to obtain an effect processed video frame;
  wherein the effect processing mode is zoom-out processing or zoom-in processing, the zoom-out processing is to magnify the target object in the video frame to realize a zooming-out video effect, and the zoom-in processing is to reduce the target object in the video frame to realize a zooming-in video effect.

Further, the effect processing mode is zoom-out processing if the preset rhythm is a strong beat, and the effect processing mode is zoom-in processing if the preset rhythm is a weak beat; or,
  the effect processing mode is zoom-in processing if the preset rhythm is a strong beat, and the effect processing mode is zoom-out processing if the preset rhythm is a weak beat.

Further, the effect processing mode is zoom-out processing by adopting a first magnification parameter if the preset rhythm is a strong beat, and the effect processing mode is zoom-out processing by adopting a second magnification parameter if the preset rhythm is a weak beat, wherein the first magnification parameter and the second magnification parameter are different parameters; or,
  the effect processing mode is zoom-in processing by adopting a first reduction parameter if the preset rhythm is a strong beat, and the effect processing mode is zoom-in processing by adopting a second reduction parameter if the preset rhythm is a weak beat, wherein the first reduction parameter and the second reduction parameter are different parameters.

Further, the first magnification parameter is greater than the second magnification parameter, and the first reduction parameter is greater than the second reduction parameter.

Further, the zoom-out processing specifically is: in the video frame, magnifying the target object to realize the zoom-out video effect until the target object is magnified to a maximum threshold value, and performing a shaking function on a video picture corresponding to the target object after being magnified to the maximum threshold value; and
  the zoom-in processing specifically is: in the video frame, reducing the target object to realize the zoom-in video effect until the target object is reduced to a minimum threshold value, and performing a shaking function on a video picture corresponding to the target object after being reduced to the minimum threshold value.

Further, the preset rhythm is a beat point, a stress point, a drum point or a preset melody point in the audio.

According to one or more embodiments of the present disclosure, there is provided a video effect processing device comprising:
  an audio detection module for detecting audio of a video, wherein the video comprises a target object;
  an image acquisition module for acquiring a video frame in the video when the audio is detected at a preset rhythm;
  an effect processing module for performing effect processing on the target object in the video frame to obtain an effect processed video frame; and
  an effect display module for displaying and playing the effect processed video frame.

Further, the effect processing module is specifically configured to: determine an effect processing mode corresponding to the preset rhythm according to the preset rhythm; perform effect processing on the target object in the video frame according to the effect processing mode to obtain an effect processed video frame;
  wherein the effect processing mode is zoom-out processing or zoom-in processing, the zoom-out processing is to magnify the target object in the video frame to realize a zooming-out video effect, and the zoom-in processing is to reduce the target object in the video frame to realize a zooming-in video effect.

Further, the effect processing mode is zoom-out processing if the preset rhythm is a strong beat, and the effect processing mode is zoom-in processing if the preset rhythm is a weak beat; or,
  the effect processing mode is zoom-in processing if the preset rhythm is a strong beat, and the effect processing mode is zoom-out processing if the preset rhythm is a weak beat.

Further, the effect processing mode is zoom-out processing by adopting a first magnification parameter if the preset rhythm is a strong beat, and the effect processing mode is zoom-out processing by adopting a second magnification parameter if the preset rhythm is a weak beat, wherein the first magnification parameter and the second magnification parameter are different parameters; or, the effect processing mode is zoom-in processing by adopting a first reduction parameter if the preset rhythm is a strong beat, and the effect processing mode is zoom-in processing by adopting a second reduction parameter if the preset rhythm is a weak beat, wherein the first reduction parameter and the second reduction parameter are different parameters.

Further, the first magnification parameter is greater than the second magnification parameter, and the first reduction parameter is greater than the second reduction parameter.

Further, Further, the zoom-out processing specifically is: in the video frame, magnifying the target object to realize the zoom-out video effect until the target object is magnified to a maximum threshold value, and performing a shaking function on a video picture corresponding to the target object after being magnified to the maximum threshold value; and, the zoom-in processing specifically is: in the video frame, reducing the target object to realize the zoom-in video effect until the target object is reduced to a minimum threshold value, and performing a shaking function on a video picture corresponding to the target object after being reduced to the minimum threshold value.

Further, the preset rhythm is a beat point, a stress point, a drum point or a preset melody point in the audio.

According to one or more embodiments of the present disclosure, there is provided an electronic device comprising:
a memory for storing non-transitory computer readable instructions; and
and a processor for executing the computer readable instructions which, when executed, enable the processor to implement the video effect processing method.

According to one or more embodiments of the present disclosure, there is provided a non-transitory computer-readable storage medium storing non-transitory computer-readable instructions that, when executed by a computer, cause the computer to perform the above-described video effect processing method.

The foregoing description is only exemplary of the preferred embodiments of the disclosure and is illustrative of the principles of the technology employed. It will be appreciated by those skilled in the art that the scope of the disclosure herein is not limited to the particular combination of features described above, but also encompasses other combinations of features described above or equivalents thereof without departing from the spirit of the disclosure. For example, the above features and the technical features disclosed in the present disclosure (but not limited to) having similar functions are replaced with each other to form the technical solution.

Further, while operations are depicted in a particular order, this should not be understood as requiring that such operations be performed in the particular order shown or in sequential order. Under certain circumstances, multitasking and parallel processing may be advantageous. Likewise, while several specific implementation details are included in the above discussion, these should not be construed as limitations on the scope of the disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A video effect processing method, comprising:
detecting audio of a video, wherein the video comprises a target object;
acquiring a video frame in the video when the audio is detected at a preset rhythm;
performing effect processing on the target object in the video frame to obtain an effect processed video frame, comprising:
determining an effect processing mode corresponding to the preset rhythm according to the preset rhythm; and
performing effect processing on the target object in the video frame according to the effect processing mode to obtain an effect processed video frame, wherein the rest of the video frame other than the target object in the video frame remains unchanged; and
displaying and playing the effect processed video frame; wherein:
the effect processing mode is zoom-out processing or zoom-in processing, the zoom-out processing is to only magnify the target object in the video frame to realize a zooming-out video effect, and the zoom-in processing is to only reduce the target object in the video frame to realize a zooming-in video effect;
the zoom-out processing specifically is: in the video frame, magnifying the target object to realize the zoom-out video effect until the target object is magnified to a maximum threshold value, and performing a shaking function on a video picture corresponding to the target object after being magnified to the maximum threshold value; and
the zoom-in processing specifically is: in the video frame, reducing the target object to realize the zoom-in video effect until the target object is reduced to a minimum threshold value, and performing a shaking function on a video picture corresponding to the target object after being reduced to the minimum threshold value.

2. The video effect processing method of claim 1, wherein:
the effect processing mode is zoom-out processing if the preset rhythm is a strong beat, and the effect processing mode is zoom-in processing if the preset rhythm is a weak beat; or,
the effect processing mode is zoom-in processing if the preset rhythm is a strong beat, and the effect processing mode is zoom-out processing if the preset rhythm is a weak beat.

3. The video effect processing method of claim 1, wherein:
the effect processing mode is zoom-out processing by adopting a first magnification parameter if the preset rhythm is a strong beat, and the effect processing mode is zoom-out processing by adopting a second magnification parameter if the preset rhythm is a weak beat, wherein the first magnification parameter and the second magnification parameter are different parameters; or,
the effect processing mode is zoom-in processing by adopting a first reduction parameter if the preset rhythm is a strong beat, and the effect processing mode is zoom-in processing by adopting a second reduction parameter if the preset rhythm is a weak beat, wherein the first reduction parameter and the second reduction parameter are different parameters.

4. The video effect processing method of claim 3, wherein the first magnification parameter is greater than the second magnification parameter, and the first reduction parameter is greater than the second reduction parameter.

5. The video effect processing method according to claim 1, wherein the preset rhythm is a beat point, a stress point, a drum point or a preset melody point in the audio.

6. An electronic device, comprising:
memory; and
a processor coupled to the memory, the processor configured to execute the video display method for performing instructions comprising:
detecting audio of a video, wherein the video comprises a target object;
acquiring a video frame in the video when the audio is detected at a preset rhythm;
performing effect processing on the target object in the video frame to obtain an effect processed video frame, comprising:
determining an effect processing mode corresponding to the preset rhythm according to the preset rhythm; and
performing effect processing on the target object in the video frame according to the effect processing mode to obtain an effect processed video frame, wherein the rest of the video frame other than the target object in the video frame remains unchanged; and
displaying and playing the effect processed video frame;
wherein:
the effect processing mode is zoom-out processing or zoom-in processing, the zoom-out processing is to only magnify the target object in the video frame to realize a zooming-out video effect, and the zoom-in processing is to only reduce the target object in the video frame to realize a zooming-in video effect;
the zoom-out processing specifically is: in the video frame, magnifying the target object to realize the zoom-out video effect until the target object is magnified to a maximum threshold value, and performing a shaking function on a video picture corresponding to the target object after being magnified to the maximum threshold value; and
the zoom-in processing specifically is: in the video frame, reducing the target object to realize the zoom-in video effect until the target object is reduced to a minimum threshold value, and performing a shaking function on a video picture corresponding to the target object after being reduced to the minimum threshold value.

7. The electronic device of claim 6, wherein:
the effect processing mode is zoom-out processing if the preset rhythm is a strong beat, and the effect processing mode is zoom-in processing if the preset rhythm is a weak beat; or,
the effect processing mode is zoom-in processing if the preset rhythm is a strong beat, and the effect processing mode is zoom-out processing if the preset rhythm is a weak beat.

8. The electronic device of claim 6, wherein:
the effect processing mode is zoom-out processing by adopting a first magnification parameter if the preset rhythm is a strong beat, and the effect processing mode is zoom-out processing by adopting a second magnification parameter if the preset rhythm is a weak beat, wherein the first magnification parameter and the second magnification parameter are different parameters; or,
the effect processing mode is zoom-in processing by adopting a first reduction parameter if the preset rhythm is a strong beat, and the effect processing mode is zoom-in processing by adopting a second reduction parameter if the preset rhythm is a weak beat, wherein the first reduction parameter and the second reduction parameter are different parameters.

9. The electronic device of claim 8, wherein the first magnification parameter is greater than the second magnification parameter, and the first reduction parameter is greater than the second reduction parameter.

10. The electronic device of claim 6, wherein the preset rhythm is a beat point, a stress point, a drum point or a preset melody point in the audio.

11. A non-transitory computer-readable storage medium storing non-transitory computer-readable instructions that, when executed by a computer, cause the processor to:
detecting audio of a video, wherein the video comprises a target object;
acquiring a video frame in the video when the audio is detected at a preset rhythm;
performing effect processing on the target object in the video frame to obtain an effect processed video frame, comprising:
determining an effect processing mode corresponding to the preset rhythm according to the preset rhythm; and
performing effect processing on the target object in the video frame according to the effect processing mode to obtain an effect processed video frame, wherein the rest of the video frame other than the target object in the video frame remains unchanged; and
displaying and playing the effect processed video frame;
wherein:
the effect processing mode is zoom-out processing or zoom-in processing, the zoom-out processing is to only magnify the target object in the video frame to realize a zooming-out video effect, and the zoom-in processing is to only reduce the target object in the video frame to realize a zooming-in video effect;
the zoom-out processing specifically is: in the video frame, magnifying the target object to realize the zoom-out video effect until the target object is magnified to a maximum threshold value, and performing a shaking function on a video picture corresponding to the target object after being magnified to the maximum threshold value; and
the zoom-in processing specifically is: in the video frame, reducing the target object to realize the zoom-in video effect until the target object is reduced to a minimum threshold value, and performing a shaking function on a video picture corresponding to the target object after being reduced to the minimum threshold value.

12. The non-transitory computer-readable storage medium according to claim 11, wherein:
the effect processing mode is zoom-out processing if the preset rhythm is a strong beat, and the effect processing mode is zoom-in processing if the preset rhythm is a weak beat; or,
the effect processing mode is zoom-in processing if the preset rhythm is a strong beat, and the effect processing mode is zoom-out processing if the preset rhythm is a weak beat.

13. The non-transitory computer-readable storage medium according to claim 11, wherein:
the effect processing mode is zoom-out processing by adopting a first magnification parameter if the preset rhythm is a strong beat, and the effect processing mode is zoom-out processing by adopting a second magnification parameter if the preset rhythm is a weak beat, wherein the first magnification parameter and the second magnification parameter are different parameters; or, the effect processing mode is zoom-in processing by adopting a first reduction parameter if the preset rhythm is a strong beat, and the effect processing mode is zoom-in processing by adopting a second reduction parameter if the preset rhythm is a weak beat, wherein the first reduction parameter and the second reduction parameter are different parameters.

14. The non-transitory computer-readable storage medium according to claim 13, wherein the first magnification parameter is greater than the second magnification parameter, and the first reduction parameter is greater than the second reduction parameter.

15. The non-transitory computer-readable storage medium according to claim 11, wherein:
the zoom-out processing specifically is: in the video frame, magnifying the target object to realize the zoom-out video effect until the target object is magnified to a maximum threshold value, and performing a shaking function on a video picture corresponding to the target object after being magnified to the maximum threshold value; and the zoom-in processing specifically is: in the video frame, reducing the target object to realize the zoom-in video effect until the target object is reduced to a minimum threshold value, and performing a shaking function on a video picture corresponding to the target object after being reduced to the minimum threshold value.

* * * * *